United States Patent [19]

Bouman, Jr. et al.

[11] Patent Number: 5,047,842
[45] Date of Patent: Sep. 10, 1991

[54] COLOR IMAGE DISPLAY WITH A LIMITED PALETTE SIZE

[75] Inventors: Charles A. Bouman, Jr., West Lafayette, Ind.; Michael T. Orchard, Princeton, N.J.

[73] Assignee: The Trustees of Princeton University, Princeton, N.J.

[21] Appl. No.: 431,487

[22] Filed: Nov. 3, 1989

[51] Int. Cl.$^5$ .............................................. B04N 1/46
[52] U.S. Cl. ......................................... 358/75; 358/80
[58] Field of Search ..................................... 358/75, 80

[56] References Cited

U.S. PATENT DOCUMENTS

| | | | |
|---|---|---|---|
| 4,244,654 | 1/1981 | Asai et al. | 358/80 X |
| 4,414,635 | 1/1983 | Gast et al. | 358/75 X |
| 4,654,720 | 3/1987 | Tozawa | 358/75 X |
| 4,689,669 | 8/1987 | Hoshino et al. | 358/80 |
| 4,907,075 | 3/1990 | Braudaway | 358/81 X |

Primary Examiner—Kenneth A. Wieder
Assistant Examiner—Glenn W. Brown
Attorney, Agent, or Firm—Perman & Green

[57] ABSTRACT

A method for creating from a digitized color image, a tree structured partitioning of all pixels in the image into M disjoint sets, with the pixels in each set having similar color values, the method comprising the steps of: separating and assigning all pixels in the image into disjoint sets so as to minimize the difference between the respective pixel color values in each set; selecting one of the sets which has a greatest variation of color values of assigned pixels, and separating and assigning all pixels in the selected set into new, disjoint sets, with the pixels assigned so as to minimize the differences between their respective color values; continuing the selecting, separating and assigning steps for sets until a total of M sets have been derived; and then assigning to all pixels in each set, a mean color value calculated from all pixel colors in the set.

12 Claims, 5 Drawing Sheets $X_S$ = PIXEL COLOR VALUE
$q_n$ = AVG. COLOR VECTOR VALUE OF COLORS IN SET
$e$ = EIGENVECTOR

S = PIXEL $x_s$ = PIXEL COLOR VALUE
$q_n$ = AVG. COLOR VECTOR VALUE OF COLORS IN SET
$e$ = EIGENVECTOR

FIG. 3

BINARY SPLITTING ALGORITHIM

INITIALIZE:

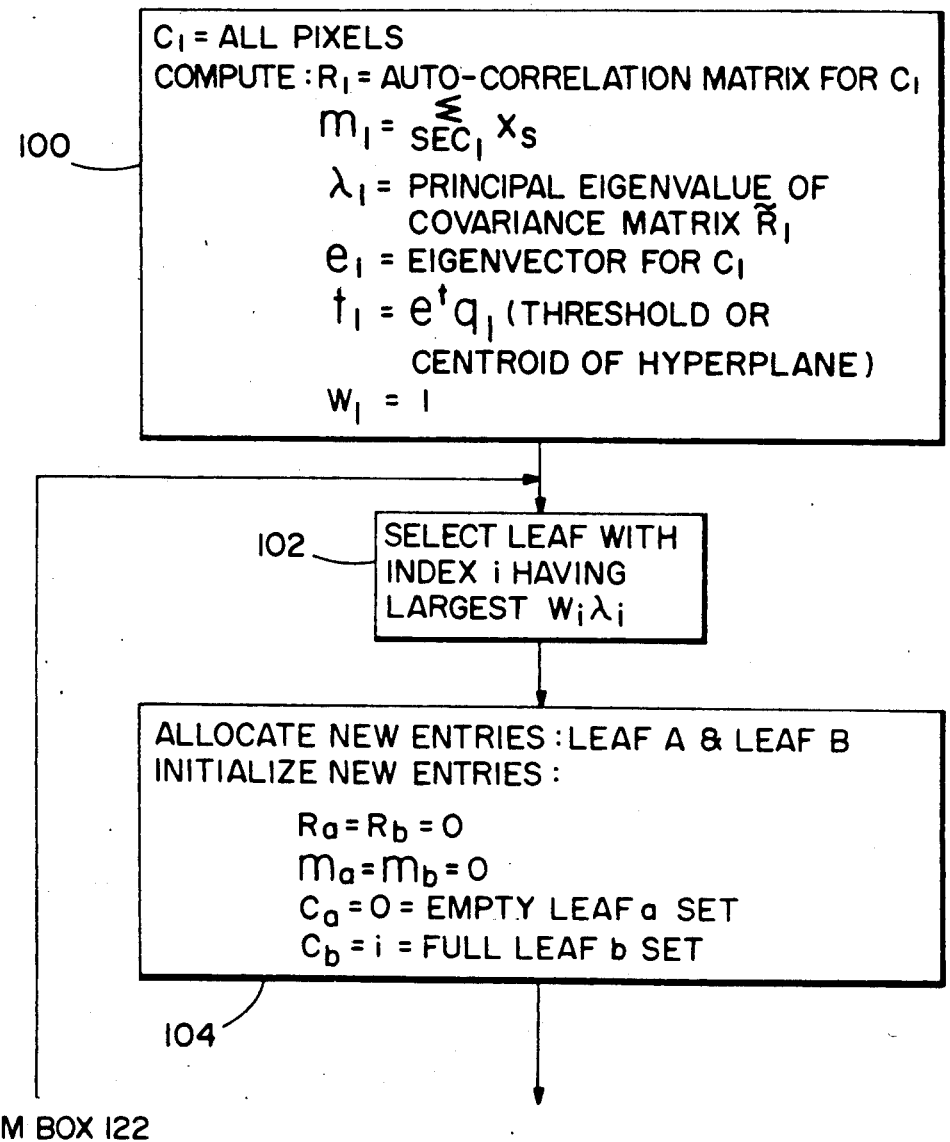

100 — 
- $C_1$ = ALL PIXELS
- COMPUTE: $R_1$ = AUTO-CORRELATION MATRIX FOR $C_1$
- $m_1 = \sum_{s \in C_1} x_s$
- $\lambda_1$ = PRINCIPAL EIGENVALUE OF COVARIANCE MATRIX $\tilde{R}_1$
- $e_1$ = EIGENVECTOR FOR $C_1$
- $t_1 = e^t q_1$ (THRESHOLD OR CENTROID OF HYPERPLANE)
- $w_1 = 1$ 102 — SELECT LEAF WITH INDEX i HAVING LARGEST $w_i \lambda_i$ 104 — ALLOCATE NEW ENTRIES: LEAF A & LEAF B
INITIALIZE NEW ENTRIES:
- $R_a = R_b = 0$
- $m_a = m_b = 0$
- $C_a = 0$ = EMPTY LEAF a SET
- $C_b = i$ = FULL LEAF b SET

FROM BOX 122

COLOR IMAGE DISPLAY WITH A LIMITED PALETTE SIZE

FIELD OF THE INVENTION

This invention relates to a method for choosing a limited set of colors which best reproduces an image containing a much larger set of colors, and, more particularly, the application of such method to a data processing system.

BACKGROUND OF THE INVENTION

Video monitors display color images by modulating the intensity of the three primary colors (red, green, and blue) at each pixel of the image. In a digitized color image, each primary color is usually quantized with 8 bits of resolution in order to eliminate distinguishable quantization steps in luminance, color hue and color saturation. Thus, full color, digital display systems use 24 bits to specify the color of each pixel on the screen. Because the cost of high speed, high resolution monitors make many applications impractical, an alternative approach used by many less costly displays, is to provide a limited number of bits, such as 8, for specifying the color at each pixel. The user is then allowed to define a mapping between those $2^8 = 256$ values and the full range of $2^{24} = 16,777,216$ colors. The set of colors available through this mapping is called palette.

Before proceeding further several definitions are useful. Quantization is the process of assigning representation values to ranges of input values. In image processing, the value being quantized can be an analog or digital signal Color image quantization is the process of selecting a set of colors to represent all the colors of an image, and computing the mapping from color space to representative colors. The invention described herein is an improved method for color image quantization and for applying the quantized colors to a pixel map to yield the highest quality image.

A number of approaches have been suggested for the design of color palettes that involve iterative refinement of an initial palette. See for instance: G. Braudaway, "A Procedure for Optimum Choice of a Small Number of Colors from a Large Color Palette for Color Imaging," IBM internal report, RC 11367 (#51227), Sept. 16, 1985, and P Heckbert, "Color Image Quantization for Frame Buffer Display," Computer Graphics, vol. 16, no. 3, pp. 297-307, July 1982.

Heckbert's method constructs an initial palette by assigning to each color from the palette an approximately equal number of pixels in the image. To improve this initial color palette, ar iterative procedure is performed, derived from the Lloyd-Max method for quantizer design, which attempts to minimize the total squared error (TSE) between the original pixels and colors assigned from the palette.

Braudaway proposes constructing an initial color palette by centering colors at peaks in the color value histogram. To avoid concentrating too many colors about one peak, the histogram values are reduced in a region surrounding each assigned color after the color is selected. Beginning at this initial palette, the same iterative approach is used as employed by Heckbert. The iterative procedure attempts to minimize the TSE, but converges only to a local minimum which is greatly influenced by the choice of the initial color palette. Since the initial color palettes in both methods do not attempt to minimize TSE, the local minimum which is reached is unlikely to be close to the global minimum. In addition, the iterative procedure is computationally intensive since, at each iteration, it requires a search of the full color palette for each pixel.

Once a color palette has been selected, pixel mapping involves assigning a color from the palette to each pixel in the image in a way which produces the highest quality display. In many applications, the efficiency of algorithms for performing color palette design and pixel mapping is important. This is particularly true in applications involving large image data bases. In such applications, images are in some common format which must be displayed on monitors having different limitations of color palette size. This requires that each display design its own color palette and perform pixel mapping after receiving each image.

Even if the color palette is transmitted with each image, standard image coding techniques require that pixel mapping be performed locally by each display system. This is because standard image coding techniques make use of the high correlation between the values of the primary colors of neighboring pixels to reduce transmission bit-rates. The color palette indices of neighboring pixels are not highly correlated and, therefore, cannot be coded with high efficiency. Thus, each local display must either design a color palette for each received image or, if a color map is provided, perform pixel mapping of the primary color values contained in the decoded image.

Accordingly, it is an object of this invention to provide an algorithm for color image quantization which selects the best set of colors, called a color palette, to represent an image containing a much larger set of colors.

It is another object of this invention to provide an algorithm which maps the pixels of an image with colors from a color palette to yield the highest quality color image, within the capabilities of a display system.

It is a further object of this invention to provide an algorithm for color image quantization and pixel color mapping which is computationally efficient.

SUMMARY OF THE INVENTION

A method for creating from a digitized color image, a tree structured partitioning of all pixels in the image into M disjoint sets, with the pixels in each set having similar color values, said method comprising the steps of:

a. Separating and assigning all pixels in the image into two disjoint leaf sets with the pixels assigned to each set so as to minimize the differences between the respective pixel color values in each set;

b. selecting one of the two leaf sets created in step (a) which has the greatest variation of color values of assigned pixels, and separating and assigning all pixels in the selected set into two disjoint leaf sets, with the pixels assigned to each leaf set so as to minimize the differences between their respective color values there being three leaf sets at this stage of the method;

c. selecting one of said three leaf set which has the greatest variation of color values of assigned pixels and separating and assigning all pixels in the selected set into two disjoint leaf sets with the pixels assigned to each leaf set so as to minimize the differences between their respective color values, there being four leaf sets at this stage of the algorithm;

d. continuing the selection, separation and assigning step, as defined in steps b and c, for leaf sets until a total of M leaf sets have been derived; and e. assigning to all pixels in a set, a mean color value calculated from all pixel color in the set.

DESCRIPTION OF THE DRAWINGS

FIGS. 3 and 4 illustrate a high level flow diagram of the binary splitting algorithm employed to map a color image onto a limited color palette.

DETAILED DESCRIPTION OF THE INVENTION

Figure 1:
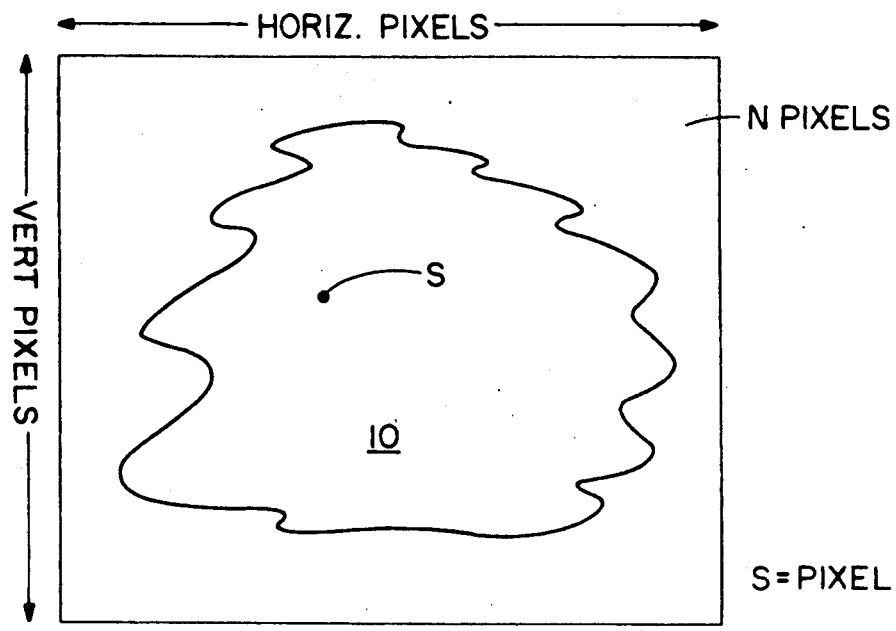
FIG. 1 is an example of a display showing a random color image whose color values are to be quantized.

As shown in FIG. 1, a given image 10 is assumed to be displayed by a rectangular grid of N pixels. The set of all grid (pixel) points is denoted by S, with each individual pixel being denoted s. Each pixel s has a color value $x_s$ with three color components; red, green, and blue. For the display of a full range of colors, such as that found in natural images, 8 bits are required for each color component, giving a total of 24 bits. As above-stated, in principal, an image can thus have $2^{24}$ or 16 million colors. A typical picture of a natural scene will have more than one hundred thousand colors. While most work stations use 24 bits to specify a color to be displayed, they also require that a table of, at most, M (typically 256) colors be defined for the display of each image. Thus, each pixel uses an 8 bit word (for M=256) to select a color from the predefined colors.

The invention comprises two portions, a color map generator and a pixel encoder. The color map generator accesses an array of data representing the red, green, and blue values of each pixel element and generates a tree-based color map of M colors which best represents the colors of the image. The pixel encoder assigns a color from the color map to each pixel of the image. The color map is derived directly from the colors contained in the original, full-color image.

In brief, the color map is constructed by creating a "tree" structure. Initially, all pixels of the image are associated with a single node of the tree, called the root node. Those pixels are then separated into two disjoint sets, each set being assigned to one of two leaf nodes deriving from the root node (once a node is separated, it can no longer be classified as a leaf node). The method for separation will be described in detail below. However, in summary, the separation algorithm computes a direction vector in color space which maximizes the sum of projected squared distances from the centroid of the set of color points, to the pixel color values in the set. The set of color points is then separated into two sets by a plane which passes through the centroid of the set and is perpendicular to the computed direction vector.

Once the two sets are derived, a new separation is undertaken, with the choice of the set to be separated being the set which exhibits the greatest variation of color values (i.e. projected squared distances). The separation algorithm is then applied to the maximum variation set and the process repeated until M set have been derived. At that point, all color values in each set are assigned the mean color value for that set.

In other words, the above procedure proceeds from the root node by separating it into two leaf nodes. One of the two leaf nodes is then selected and the pixel colors associated with it are separated into two groups etc., until M leaf nodes are present in the tree. Then, all pixels in each of the leaf nodes are displayed using the same color. It will be noted hereinafter that the selection of the leaf node to split at each step and the method used for separating the pixels in a node into two groups is designed to assure that the pixels in each of the M final leaf nodes have colors very close to one another.

Figure 2:
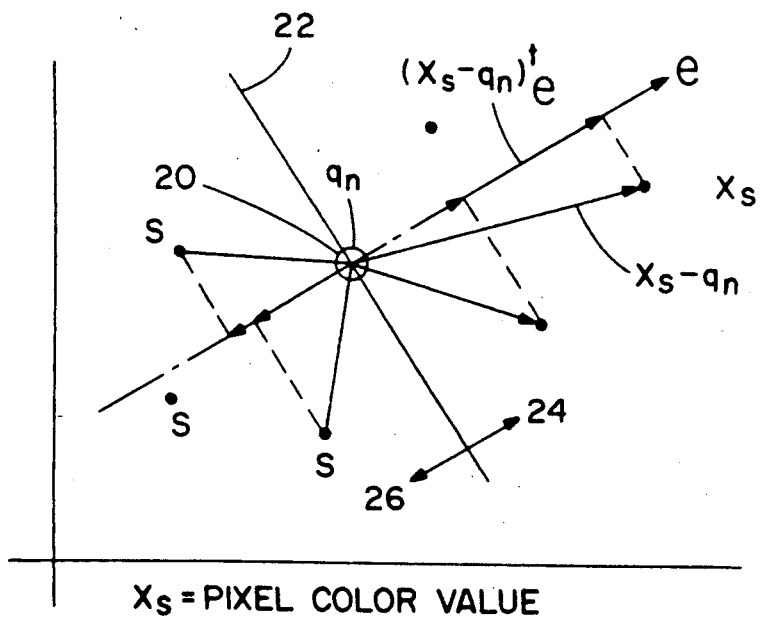
FIG. 2 is a geometric construct which illustrates, in color space, the effect of certain mathematical operations on a "cloud" of pixel color vector values.

Referring to FIG. 2, a geometrical construct of "color space" is illustrated to enable a better understanding of the separation method. A plurality of pixels s are shown, each having a color value $x_s$. The centroid of all pixels 20 has a value $q_n$ which is the mean of all color values in the color space. The objective is to find an Eigenvector e which defines the direction in which the sum of all squared projections along the Eigenvector of the distance from each color value to the centroid color value $q_n$, is maximum. When that Eigenvector direction is determined, a perpendicular plane 22 is determinable and enables the set of color values to be divided into two subsets, one in the direction of arrow 24 and another in the direction of arrow 26.

As above-stated the objective of the palette design algorithm is to partition the set of grid points s into M subsets or clusters, where M is the predetermined palette size determined by hardware constraints. For the purposes of illustrating the operation of the algorithm, the nodes of the binary tree will be numbered so that the root node is 1 and the leaf nodes are 2n and 2n+1. Since the leaves of the tree form a partition, the pixels in any partition may be coded by representing all pixels in each leaf node with a single color in the palette. Each of the leaf node sets can be stored as a linked list. When a node is split, the linked list may be reorganized into two lists without relocating any of the image color data.

In the succeeding description, a knowledge of linear algebra is presumed. A useful text in this regard is "Linear Algebra and Its Applications", Second Edition, G. Strang, Academic Press. Further, this invention requires the solutions of matrix equations to determine eigenvalues and eigenvectors. Methods for such solutions are known in the art and may be found both in the cited Strang reference and are available in software form to enable a personal computer to realize such functions.

The method for generating the binary tree is specified by the number of leaves M (the number of sets of possible colors); the method of splitting a node into its leaf nodes; and the order in which the nodes are split. The methods for splitting nodes and determining which nodes to split attempt to minimize the total squared difference between the actual and quantized image. The total squared error (TSE) is defined by:

$$TSE = \sum_{\text{all leaves} \atop n} \sum_{s \in C_n} ||x_s - q_n||^2 \quad (1)$$

where $q_n$ is the quantization value used to represent the colors in the set $C_n$. Three color statistics are required:

$$R_n = \sum_{s \in C_n} x_s x_s^t \quad (2)$$

$$m_n = \sum_{s \in C_n} x_s \quad (3)$$

$$N_n = |C_n|. \quad (4)$$

Equation 2 expresses the value for $R_n$ which is the autocorrelation matrix for all color point values in $C_n$. $R_n$ contains information concerning the spread of pixel color values in set $C_n$ about the origin 0,0,0. Equation 3 expresses a value $m_n$ which is the vector sum of color values of the pixels in set $C_n$. Equation 4 is the number of pixels in set $C_n$.

Since the mean value of a cluster is the point from which there is minimum squared deviation, the quantization value of a cluster, $q_n$ is assumed equal to the cluster mean as follows:

$$q_n = \frac{m_n}{N_n}. \quad (5)$$

The cluster covariance is defined as:

$$\tilde{R}_n = R_n - \frac{1}{N_n} m_n m_n^t. \quad (6)$$

and it indicates the spread of a set of pixel color values about the set's centroid.

The splitting of a node into two nodes is equivalent to choosing two new quantization levels and associating each member of the cluster with the closer quantization level. This in turn is equivalent to selecting a plane which best splits the clusters' colors. The method used to determine the splitting plane is based upon a determination of the direction in which the clusters' variation is greatest. Once that direction is determined, the splitting plane is oriented perpendicular to that direction and passes through the mean (centroid) of the set $C_n$. In specific, a unit vector e is determined which maximizes the expression:

$$\sum_{s \in C_n} ((x_s - q_n)^t e)^2 = e^t \tilde{R}_n e. \quad (7)$$

Since $\tilde{R}$ is symmetric, the solution to equation 7 is the Eigenvector $e_n$ which corresponds to the largest or principal Eigenvalue $\lambda_n$ of $\tilde{R}$. This Eigenvector $e_n$ specifies the direction in which the cluster's color value variation is greatest. The total squared variation in the direction $e_n$ is therefore:

$$\sum_{s \in C_n} ((x_s - q_n)^t e_n)^2 = \lambda_n. \quad (8)$$

Once the principle Eigenvector has been determined, color points in $C_n$ can be sorted into two sets $C_{2n}$ and $C_{2n+1}$ in the following manner.

$$C_{2n} = \{s \in C_n : e_n^t X_3 \leq e_n^t q_n\} \quad (9)$$

$$C_{2n+1} = \{s \in C_n : e_n^t X_3 > e_n^t q_n\}. \quad (20)$$

Equation 9 and 10 separate the pixels of $C_n$ based on their color value position in color space relative to a splitting plane perpendicular to the Eigenvector $e_n$ and passing through the centroid $q_n$. Finally the new statistics for each node may be calculated by first calculating $R_{2n}$, $m_{2n}$, and $N_{2n}$ for node 2n and then applying the relations:

$$R_{2n+1} = R_n - R_{2n} \quad (11)$$

$$M_{2n+1} = M_n - M_{2n}$$

$$N_{2n+1} = N_n - N_{2n}.$$

The order in which the nodes are split is chosen to produce the greatest reduction in total squared error after splitting. Thus, when a node is split, its variance is mainly reduced along the direction of the principal Eigenvector. It is assumed that the reduction in TSE is proportional to the total squared variation along the direction of the principal Eigenvector given in equation 8. If the distribution of the error is Gaussian, then for large clusters this is true. For this reason, the principal Eigenvalue $\lambda_n$, is used as a measure of the expected reduction in TSE if node n is split. Thus, the best allocation of a single quantization level is to split the leaf with the largest principal Eigenvalue.

In summary, the basic binary quantization algorithm is as follows:
1. Set $C_1 = S$
2. Calculate $R_1$, $m_1$, and $N_1$.
3. Do the following $M - 1$ times
   3.1 Find the leaf, n, such that $\lambda_n$ is largest.
   3.2 Use equations 9 and 10 to form the new nodes 2n and $2n + 1$.
   3.3 Calculate R, m and N for the new nodes using equations 11.

Figure 4:
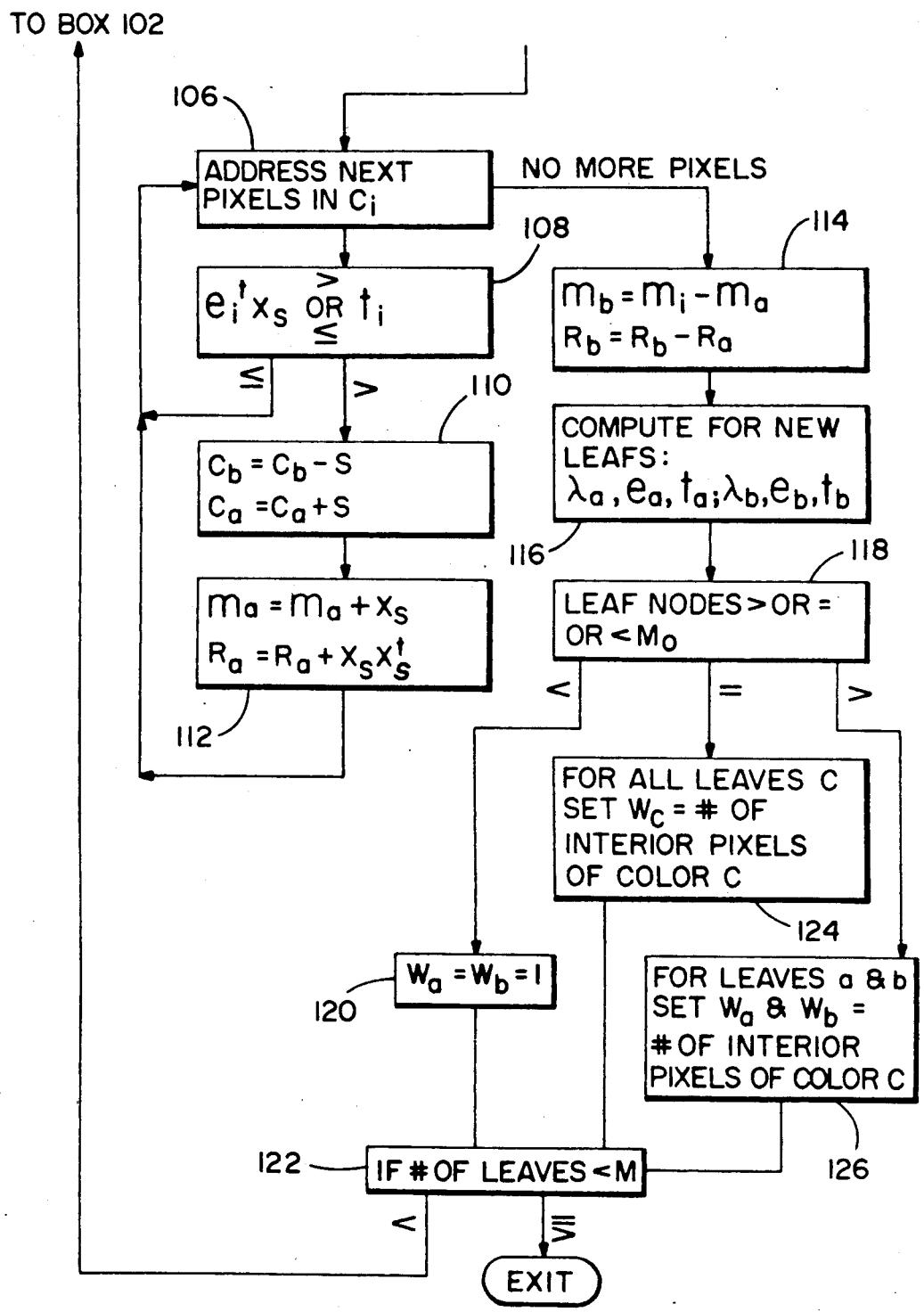

Turning now to FIGS. 3 and 4, a more detailed diagram of the binary splitting algorithm is illustrated. Initially, it is assumed that set $C_1$ includes all of the pixels in the image. As shown in box 100, initialization involves computing the following factors: $R_1$ which equals the autocorrelation matrix for the pixel color values in set $C_1$; $m_1$ which is the vector sum of pixel color values of all pixels in $C_1$; $\lambda_1$ which is the principal Eigenvalue of covariance matrix $\tilde{R}_1$; $e_1$ which is the principal Eigenvector for $R_1$; $t_1$ which defines a threshold for specifying the hyperplane that will be used to divide set $C_1$; and $w_i = 1$ which is a weighting factor initially set to 1, and will be described below.

The first step of the algorithm (box 102) involves selecting the leaf with the largest $w_i \lambda_i$. $\lambda_i$ is the principal Eigenvalue of the set $C_i$. The first time this stage of the algorithm is reached there is only one set $C_1$, and step 102 selects leaf 1 (where i = 1).

The program proceeds to box 104 wherein two new entries, leaf a and leaf b are allocated. The autocorrelation matrices for both leaf a and leaf b are set equal to 0 as are the vector sums of their color values. Set $C_a$ is made equal to 0, indicating that it is an empty set and that no pixels have yet been assigned to it. Set $C_b$ is made equal to $C_i$ indicating that all pixels from $C_i$ are initially assigned to it.

The algorithm continues in FIG. 4 by selecting a pixel s in $C_i$ 106). As shown in box 108, the algorithm then determines whether the inner product of two vectors, Eigenvector $e_i$ (transformed) and color vector $s_s$ is less than or equal to threshold $t_i$ or is greater than threshold $t_i$. It will be recalled that $t_i$ defines the location of the hyperplane dividing set $C_i$. If the inner product is found to be less than or equal to the threshold, then it is determined that pixel s is properly assigned to set $C_b$ and the algorithm returns to box 106. If on the other hand, the inner product is found to be greater than $t_i$, the algorithm proceeds to box 110 where pixel s is assigned to set $C_a$ and taken from set $C_b$. The vector sum $m_a$ and the autocorrelation matrix $R_a$ for set $C_a$ are then updated as shown in box 112. At this point, the algorithm recycles to the next pixel color value. When all pixel color values have been processed, the vector sum $m_b$ and autocorrelation matrix $R_b$ are recalculated for set $C_b$ (box 114). At this point, sets $C_a$ and $C_b$ are completely configured and the variables shown in box 116 are then computed for each of the new leafs.

Before describing the remainder of the algorithm of FIG. 4, a method for improving the quantization quality (which is implemented in the remaining boxes of FIG. 4) will be described. This method depends directly on the qualities of the quantized image and enables the method to dynamically focus quantization values on regions of the image which are particularly problematic. The method allows regions of the quantized image which may result in false contouring to be efficiently identified while the binary tree is being created, thus enabling the relevant clusters to be split to avoid artifacts.

The visual effect of false contouring is caused by large regions of the image being quantized to a single color value. Such regions of the image may be identified by searching the leaf nodes for sets of pixels $C_n$ which have large spacial interiors in the original image. The search is accomplished by selecting a fixed pattern of lattice points and counting the number of times the pattern may be uniquely positioned completely within a region, all of whose pixels are assigned the same single color. Based on this count of unique positionings, a weighting value is assigned to the region and that value used to raise the probability of the particular area being divided. This weighting value measures the potential for visibly noticeable false contouring, and by splitting sets with large values first, the contouring effect is ameliorated.

Figure 5:
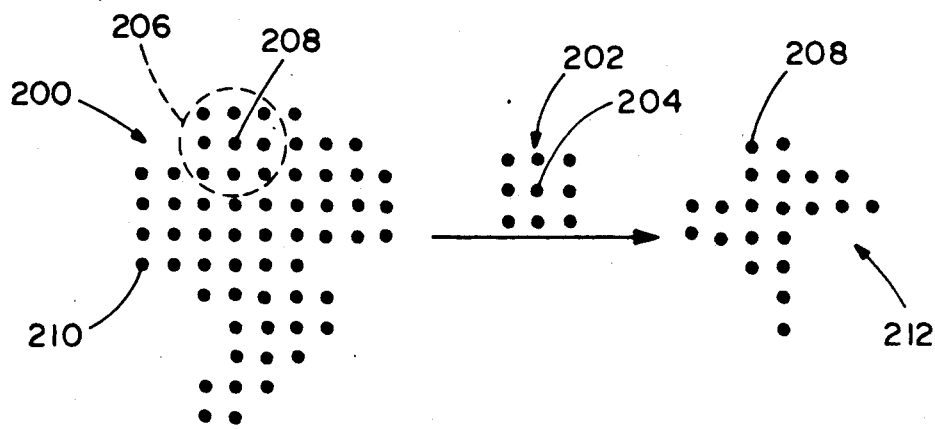
FIG. 5 illustrates a technique for determining the interior size of a single color area.

In FIG. 5 the method is schematically illustrated. If it is assumed that all pixels in pixel group 200 have the same quantized color, an interior size value $w_n$ is derived for pixel area 200 as follows. A pixel cluster or neighborhood 202 is repetitively overlaid over each pixel in group 200. Then, only if center pixel 204 is surrounded by identical color pixels 200, is the pixel "beneath" center pixel 204 assigned to the "interior" size of cluster 200. For instance, if center pixel 204 is superimposed over pixel group 206, then pixel 208 is assigned as an interior pixel since all of its surrounding pixels exhibit the identical color value. If on the other hand, pixel group 202 is overlaid so that pixel 204 overlays pixel 210, all pixels surrounding pixel 204 do not have the same color value and thus pixel 210 is not designated as an interior pixel. The pixels designated as interior pixels are illustrated by interior pixel group 212 on the right side of FIG. 5. At the end of this procedure, the number of pixels $w_n$ in the interior cluster 212 is assigned as a measure of the number of interior pixels in the cluster. The larger the value of $w_n$, the more desirable it is to divide the pixel area and reallocate the color values.

The use of $w_n$ as a "weighting factor" is not instituted until a certain number of leaf nodes have already been processed (as indicated in FIG. 4, box 118). To accomplish this, a preselected number $M_O$ is chosen and used as a threshold value. If the number of leaf nodes is less than $M_O$, the value of $w_n$ is arbitrarily set to 1 (box 120). The process proceeds to box 122 to determine if less than M leaf nodes have been derived. If the answer is less, the program recycles to box 102.

As indicated in box 124, when the number of leaf nodes equals $M_O$, the algorithm requires, for all leaves (sets), that weighting value $w_n$ for each leaf n be set equal to the number of interior pixels in the set $C_n$. The program then proceeds to determine whether the number of leaves is less than M and, if so, it recycles to box 102. Finally, if the number of leaf nodes is determined in box 118 to be greater than $M_O$, the program proceeds to box 126 and for leaves a and b sets $w_a$ and $w_b$ equal to the number of interior pixels of sets $C_a$ and $C_b$ respectively. It will be noted, referring back to FIG. 3, box 102, that the value w comes into play in so far as it weights the Eigenvalue which determines which leaf is to be selected for splitting.

The calculation of the weights $w_n$ represents only a modest overhead in computation because they can be efficiently computed using only compare and logical operations. Also, since the splitting of a cluster only affects the interior points of the cluster being split, only the two weights associated with the two new clusters must be recomputed. The time required to recompute these two weights is of the order of the number of pixels in the cluster being split.

What should be apparent from the above is that, a tree of partitioned color values is produced from the pixel color values, with the tree comprised of many less leaves than the pixel color values. If $M=256$ (8 bits), there will be approximately 8-10 levels of the tree. Given this tree structure, the processing required to classify a particular color value involves a search which comprises a single operation at each level of the tree. That operation is the decision as to which side of the hyperplane, defined at that node of the tree, the pixel color value falls. As a result, efficient pixel mapping is accomplished with a minimum of operations depending on the number of levels of the tree. By contrast, a non-tree structured pixel classification would require, for each pixel color value, $M=256$ operations (as compared to 8-10 for this invention).

Figure 6:
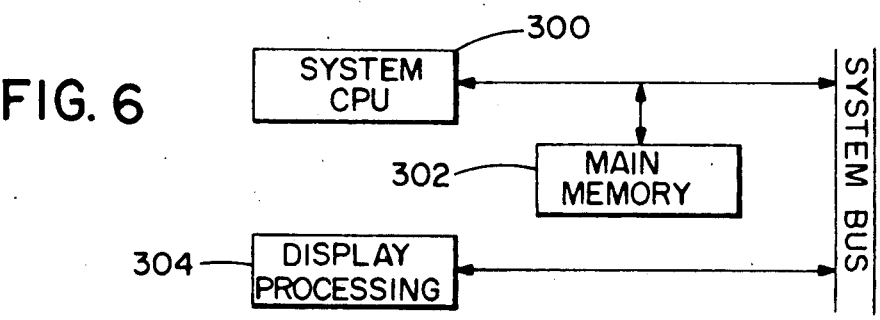
FIG. 6 is a block diagram of a system interface for a display processing module employed by the invention.

Hardware for implementing the invention includes a display processing unit designed to interface with the system bus of any general purpose computer which displays color images. FIG. 6 shows a system overview of such a general purpose computing environment. During color map generation, system CPU 300 accesses image data and writes it to a display processing module 304, where a color map generator (shown in FIG. 7) computes and stores the pixel statistics used in the construction of the color map. The system main memory 302 holds the array of image pixel color values as well as a group of singly linked lists, one associated with each leaf index n, which identify the pixels of the image belonging to the sets $C_n$.

During each processing stage of color map generation, CPU 300 receives the index n from display processing unit 304, uses the corresponding linked list to access the color values of pixels in $C_n$, and writes these values to a port of display processing module 304. As color map entries are split to form new entries, system CPU 300 has responsibility for creating an maintaining linked lists for the new entries. When a pixel is moved from $C_b$ to $C_a$ during processing, CPU 300 is informed by an interrupt from display processing module 304 and updates the appropriate linked lists. Finally, during the later stages of processing, CPU 300 determines from the linked lists, which pixels in each $C_n$ are interior pixels and computes the value of $w_n$. System CPU 300 writes the computed values of $w_n$ to a port on display processing module 304.

Figure 7:
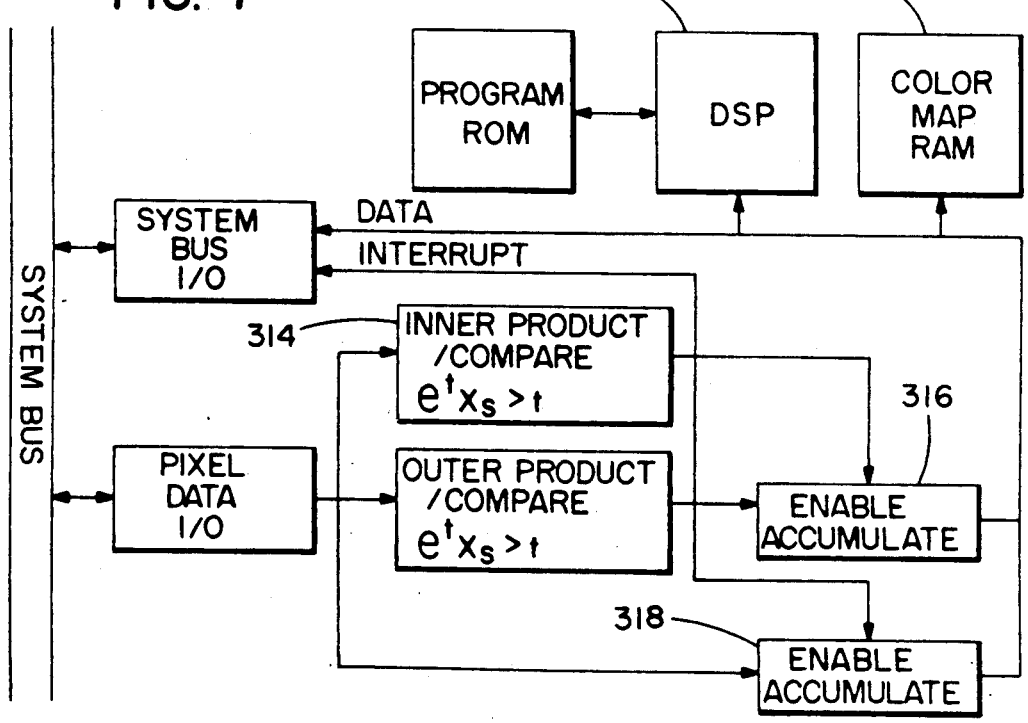
FIG. 7 is a block diagram of the pixel encoding system employed by the invention.

FIG. 7 shows a block diagram of display processing module 304 which implements the color map generator.

Digital signal processor (DSP) 310 initializes and controls the functions of the color map generator and communicates with the system CPU via the system bus to exchange processing requests and to output the resulting color map. On a request from the system CPU, DSP 310 initializes processing by disabling the inner-product/compare block 314 (durinq construction of the root color map entry, no inner-product/compares are performed), and clearing accumulators 316 and 318. DSP 310 then instructs the system CPU to access all pixels of the image and write them to a pixel-data port on the system bus. As each pixel is received, an outer-product and the two accumulator blocks update $R_1$ and $m_1$. The system CPU notifies DSP 310 when all pixels have been written. DSP 310 reads the values of $R_1$ and $m_1$ from accumulators 316, 318, performs an Eigenvalue analysis and stores all computed parameters of the root color map entry in color map RAM 320.

DSP 310 begins each subsequent processing stage by determining which color map entry should be split, writing the corresponding values of $x_{cm}$ and $t_{cm}$ to inner-product/compare block 314, and notifying the system CPU of the index n of the linked list to access. When each pixel is received, inner-product/compare block 314 determines what further processing is required. If inner-product/compare block 314 outputs 1, accumulators 316 and 318 are enabled to update the values of $R_a$ and $m_a$, and an interrupt is generated to instruct the system CPU to update its linked lists to move the current pixel from $C_b$ to $C_a$. The system CPU notifies DSP 310 when the end of the linked list corresponding to $C_n$ has been reached. DSP 310 then reads $R_a$ and $m_a$ from accumulators, 316, 318, computes the values of $R_b$ and $m_b$, performs an Eigenvalue analysis for both new entries and stores the new color map entries in RAM 320. During the later stages of the algorithm, the system CPU sends the values of $w_n$, which it computes from the linked lists, to DSP 310 for use in determining which color map entries to split. When M leaf nodes of the tree have been constructed, DSP 310 sends the color map to the system CPU for storage.

Given the binary tree used in generating the color map, the pixel encoder then assigns a color from the map to each pixel of the image. The pixel encoder encodes each pixel by determining the correct descending path the tree's root to the unique leaf which contains that pixel. This process only requires that approximately log(M) decisions be made in finding the unique path. In contrast, an exhaustive search of the M color map entries would be much less efficient, since it would require at least M operations to encode each pixel. To implement the tree based search, the pixel encoder uses only the tree's structure and the values $x_n$ and $t_n$ obtained for the tree's nodes during the binary tree's construction. At each interior node of the tree, the decision on which child node to choose in extending the path is made by performing the comparison $$e_n{}^t x_s < t_n.$$

The colors $q_n$ of the leaf nodes are also required for setting the display color associated with each corresponding color map entry, however these colors are not used for pixel encoding.

Figure 8:
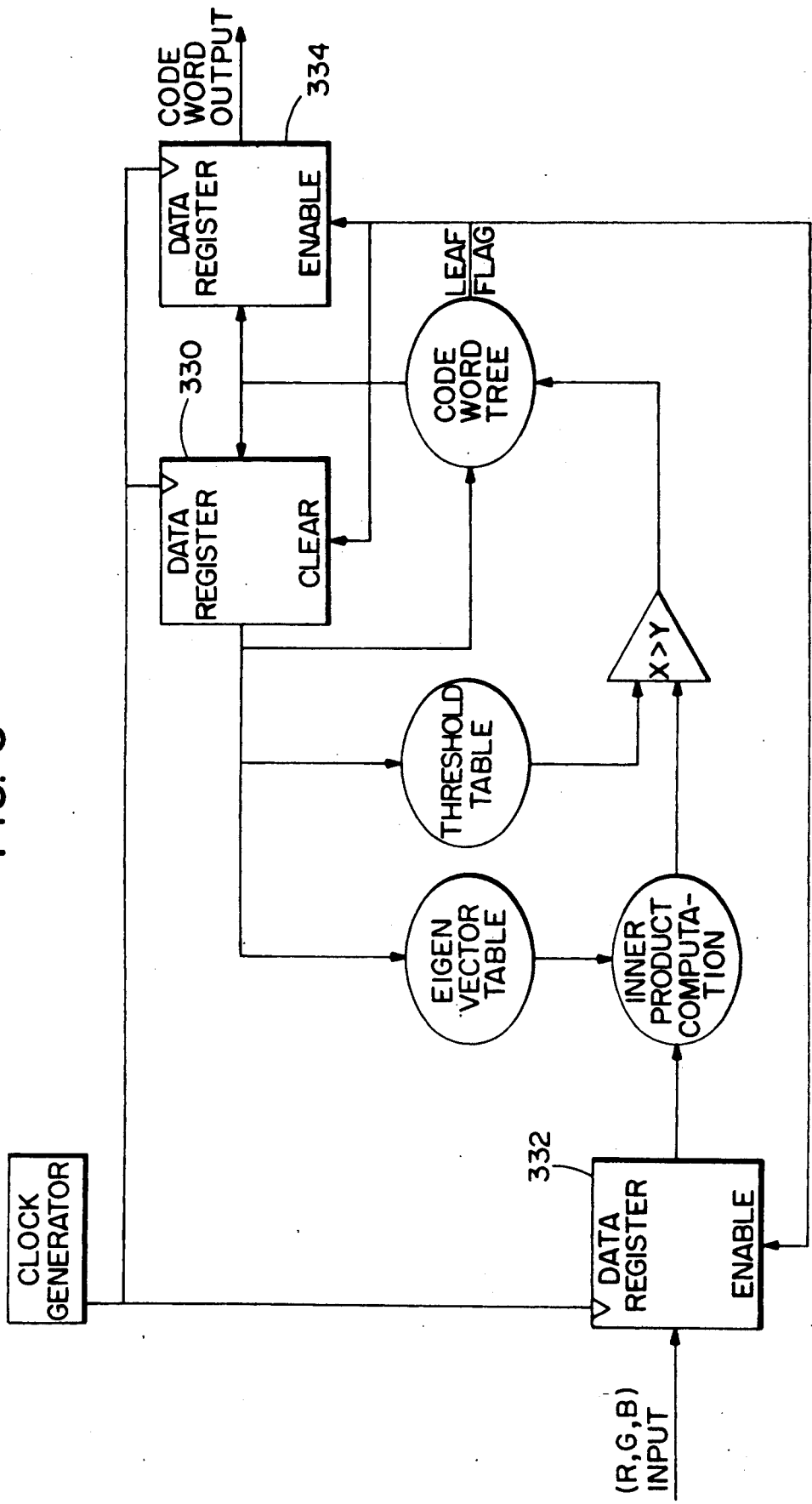
FIG. 8 is a block diagram of the color map generator employed by the invention.

The block diagram of the pixel encoder is shown in FIG. 8. It is also implemented in a display processing unit and shares functional blocks such as inner-product/compare block 314 with the color map generator. Register 330 is initialized to 0 to address the top node of the tree. During the tree search for each pixel, its color value $x_s$ is held in register 332. For each color map node n, an inner product and comparison is performed:

$$e_n{}^t x_s < t_n$$

and the result determines the least significant address bit to the memory which accesses the index of the next color map node. This index is clocked into register 330 to start the search at the next level of the tree. A "1"' at a leaf "flag" indicates that a leaf node has been reached. The node index is clocked into register 334 for output to the display, register 332 clocks in the next pixel color value, and register 330 is cleared for the next pixel search.

To summarize, in applications involving a large database of images, images are often stored and transmitted in compressed form. Standard compression algorithms cannot be applied to a color map encoded image, so the display receiving such an image must do the encoding at the time of display. The high efficiency of the pixel encoder of this invention is, in part, due to the tree structure of the color map and makes real time encoding of images possible.

For typical image sizes (512×512 pixels), the computation is dominated by steps which must be performed at each pixel of the image. These are involved in the computation of equations 2, 3, 9, and 10. Assuming an approximately balanced tree, each pixel of an image is involved in log M splits, each requiring three multiplications to compute equations 9 and 10. Assuming approximately balanced splitting of each node, half the pixels are used in the computation of equations 2 and 3. Based on these assumptions, 6N log M multiplications and slightly less additions are required for the design of the color palette. Therefore, fewer multiplications are required for the design of the complete color palate than a single iteration of the Lloyd-Max procedure for !minimum TSE quantization design.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for creating from a digitized color image, a tree structured partitioning of all pixels in the image into M disjoint sets, with the pixels in each set having similar color values, said method comprising the steps of:
   a. separating and assigning all pixels in the image into two disjoint sets with the pixels assigned to each set so as to minimize the differences between the respective pixel color values in each set;
   b. selecting one of the two sets created in step (a) which has the greatest variation of color values of assigned pixels, and separating and assigning all pixels in the selected set into two new disjoint sets, with the pixels assigned to each new set so as to minimize the differences between their respective color values, there being three disjoint sets at this stage of the method;
   c. selecting one of said three sets which has the greatest variation of color values of assigned pixels and separating and assigning all pixels in the selected set into two new disjoint sets, with the pixels assigned to each new set so as to minimize the differences between their respective color values, there being four disjoint sets at this stage of the algorithm;
   d. continuing said selecting, separating and assigning actions, as defined, for sets until a total of M disjoint sets have been derived; and
   e. assigning to all pixels in a set, a mean color value calculated from all pixel colors in the set.

2. The method as defined in claim 1, wherein said separating and assigning steps further comprise the steps of:
   determining a direction vector in color space such that a sum of squared distances from a centroid of the selected set of color values to the pixel color values in the selected set, projected onto said direction vector, is maximized; and separating said selected set by dividing said pixel color values by a plane passing through said centroid and perpendicular to said direction vector.

3. The method as defined in claim 2 wherein said selecting step further comprises choosing a set, based upon a variable derived from said set which indicates a maximum variation of pixel color values.

4. The method as defined in claim 3 wherein said direction vector is an Eigenvector e which maximizes the expression:

$$\sum_{s \epsilon C_n} ((x_s - q_n)^t e)^2 = e^t R_n e.$$

where:
$C_n$ = set of pixels
$s$ = pixel number
$x_s$ = pixel color value
$q$ = average color vector value in $C_n$
$\tilde{R}_n$ = covariance matrix for $C_n$.

5. The method as defined in claim 4 wherein a maximum variation of pixel color values is derived from the sum of squared distances from said centroid, of projections of said pixel color values on said Eigenvector.

6. The method as defined in claim 5 wherein said maximum variation of pixel color values is determined from a principal Eigenvalue $\lambda_n$ as determined from the following expression:

$$\sum_{s \epsilon C_n} ((x_s - q_n)^t e_n)^2 = \lambda_n.$$

7. The method as defined in claim 2 wherein, after said selected set has been divided, the method includes the additional step of:
   calculating for each divided set, the variables $\lambda_n$, $e_n$, and $t_n$, where
   n = index of a set
   $\lambda_n$ = principal Eigenvalue for the matrix $R_n$
   $e_n$ = principal Eigenvector for the matrix $R_n$, and
   $t_n = e^c q$, with q = average color vector value of the set.

8. The method as defined in claim 7, further comprising steps of:
   determining interior pixels in a set; and
   deriving a weighting value for the set which is an indicator of the number of interior pixels in said set for which said interior pixels have been determined.

9. The method as defined in claim 8, further including the step of:
   combining said weighting value for each set with each set's principal Eigenvalue $\lambda_n$ and choosing a pixel color segment based upon the set exhibiting the greater of such combined values.

10. The method as defined in claim 9 wherein said combining step as recited in claim 9, is not implemented until more than a majority of said M disjoint sets have been derived.

11. A method for classifying pixel color values which employs a tree structured partition of color values derived from a digitized color image, comprising for each pixel color value, the steps of:
   a. deciding into which of a pair of disjoint sets a pixel belongs, said sets including pixel color values from said color image which have been separated so as to minimize the differences between the respective color values in each set, and assigning said pixel to said set, based on which set's color values are more similar to the color value of said pixel;
   b. deciding for a next level of said tree structured partition, which set branching from the set to which said pixel color was assigned in (a) above, has a color value closer to the color value as said pixel and assigning said pixel to that set; and
   c. repeating the deciding and assigning steps of step (b) until said pixel is assigned to one of M disjoint sets of the tree.

12. A method for creating from a digitized color image, a tree structured partitioning of all pixels in the image into M disjoint sets, with the pixels in each set having similar color values, said method comprising the steps of:
   a. Separating and assigning all pixels in the image into disjoint sets so as to minimize the differences between the respective pixel color values in each set;
   b. selecting one of the sets created in step (a) which has the greatest variation of color values of assigned pixels, and separating and assigning all pixels in the selected set into new disjoint sets, so as to minimize the differences between the respective color values in each set;
   c. continuing said selecting, separating and assigning actions, as defined in (b), for sets until a total of M disjoint sets have been derived; and
   d. assigning to all pixels in a set, a mean color value calculated form all pixel colors in the set.

* * * * *